United States Patent [19]

Busch, Jr. et al.

[11] Patent Number: 5,408,513
[45] Date of Patent: Apr. 18, 1995

[54] PORTABLE CREDIT CARD TERMINAL INTERFACE

[76] Inventors: Charles Busch, Jr.; Charles Busch, III, both of 1501 Parks Rd., Oakland, Mich. 48363

[21] Appl. No.: 127,001

[22] Filed: Sep. 24, 1993

[51] Int. Cl.⁶ .......................................... H04N 11/00
[52] U.S. Cl. ...................................... 379/59; 379/91; 379/144
[58] Field of Search ............... 379/58, 59, 91, 144, 379/357; 455/126, 127, 343

[56] References Cited

U.S. PATENT DOCUMENTS

| | | | |
|---|---|---|---|
| 4,845,740 | 7/1989 | Tokuyama et al. | 379/91 |
| 4,868,846 | 9/1989 | Kemppi | 379/144 |
| 4,965,821 | 10/1990 | Bishop et al. | 379/91 |
| 5,208,446 | 5/1993 | Martinez . | |
| 5,247,160 | 9/1993 | Zicker | 379/91 |

OTHER PUBLICATIONS

"Introducing the POS-50" by U.S. Wireless Data.
"Bringing Cellular convenience to Data Communications", Publication by PowerTek.
"Using the bq2003 to Control Fast Charge" by Benchmarq Microelectronics, Inc., 1992.

Primary Examiner—Curtis Kuntz
Assistant Examiner—Dwayne D. Bost
Attorney, Agent, or Firm—Brooks & Kushman

[57] ABSTRACT

A portable credit card terminal interface is disclosed for verifying credit information. The portable credit card terminal interface is adapted to be removably connected to a credit card terminal and to a telephone station. The credit card terminal interface includes a D/C power storage device and converter for converting D/C power from the storage device into A/C power. The device also is capable of for transmitting A/C power from the converter to the credit card terminal and detecting financial information signals representing credit and transaction information. The device further includes a first circuit for receiving from the credit card terminal the financial information signals and a second circuit for receiving from the telephone station verification signals representing verification information from a host computer. Finally, the device includes a control circuit for controlling the converter as well as for controlling both the first circuit and the second circuit means. The control circuit controls the first circuit to route the financial information signals from the credit card terminal to the telephone station and routes. The control circuit controls the second circuit to route the verification signals from the telephone station to the credit card terminal.

10 Claims, 11 Drawing Sheets

PORTABLE CREDIT CARD TERMINAL INTERFACE

TECHNICAL FIELD

This invention relates generally to devices for verifying credit information associated with a credit card. In particular, this invention relates to an apparatus for providing a portable interface between a credit card terminal and a telecommunication line.

BACKGROUND ART

There are many businesses in which it is conducive to provide goods or services in a remote location such as an automobile, a private residence or any location other than a traditional store or office. A few such businesses include flea markets, landscaping services and home delivery of products such as food or furniture.

Vendors operating at remote locations have long wrestled with the problem of receiving payment for the goods or services they provide. Although providing a variety of payment alternatives can increase the competitiveness of vendors operating at remote locations, such vendors also wish to minimize the risk of fraud.

Typically, vendors concerned over the risk of fraud have required customers to provide payment in cash or by certified check. Payment by credit card at a remote location has historically been refused because the credit-worthiness of the card could not be practically determined.

Therefore, in order to expand the number of payment methods available to vendors at remote locations, attempts have been made to provide practical remote credit card verification. One such attempt is described in U.S. Pat. No. 5,208,446 to Martinez which discloses a method and apparatus for validating credit information during home delivery of an order.

The invention of Martinez provides a home delivery system including a host computer and a portable validation unit. The system permits a vendor to read magnetically stored credit information from a credit card at a remote site using the portable validation unit. The portable validation unit transmits the credit information to the host computer for validation. The host computer determines whether the card is acceptable and transmits the results to the portable validation unit.

A number of remote validation units similar to the unit described by Martinez are commercially available. Such units include the U.S. Wireless Data POS-50 wireless mobile credit card terminal, the PowerTek CMI-3000 cellular data link.

While all of these units provide the capability to validate credit cards at remote locations, these units have significant shortcomings. A first shortcoming is that these units require a cellular telephone line to be dedicated to the remote validation unit. A different cellular telephone line cannot be readily accessed without reprogramming the unit by trained personnel.

A second shortcoming is that these units are not cost effective for the vendor who only occasionally requires remote credit card validation. These units are considerably more expensive than stationary credit card validating devices because they incorporate many different technologies. The only major practical difference, however is their portability.

A third shortcoming is that these devices rely exclusively on cellular technology and are incompatible with other conventional communication schemes. In other words, if a vendor's business changed from remote sales to store sales, new credit card validation equipment would need to be purchased.

Another shortcoming is the power required by such devices. Due to the high power requirements of such devices and the lack of energy saving features, the battery life of the prior art devices remains low. Vendors conducting business for significant durations require a longer battery life than that presently available.

A need therefore exists for an apparatus which addresses the shortcomings of the remote credit validation devices presently known and available. In view of the prior art, there is a need to develop an inexpensive device which does not require a dedicated cellular telephone line.

A need further exists for a device which does not rely exclusively on a particular telecommunication technology. Another need exists for a device which provides credit card validation functionality for a longer duration than presently available.

SUMMARY OF THE INVENTION

A first aspect of the present invention described and disclosed herein comprises a credit card terminal interface for verifying credit information.

It is an object of the present invention to provide an inexpensive and easy to use apparatus for verifying credit information at a remote location.

It is another object of the present invention to provide a device for verifying credit information at a remote location which is compatible with existing communication equipment and credit card terminals.

It is a further object of the present invention to provide a device for verifying credit information which is portable without requiring a dedicated cellular telephone line.

It is yet another object of the present invention to provide a device for verifying credit information at a remote location which conserves energy.

In carrying out the above objects and other objects of the present invention, a portable credit card terminal interface is provided for verifying credit information. The portable credit card terminal interface is adapted to be removably connected to a credit card terminal and a telephone station.

The device of the present invention includes a DC power storage device and a means for converting DC power from the storage device into AC power. The device further includes a means for transmitting AC power from the means for converting to the credit card terminal.

The device also includes means for detecting financial information signals from the credit card terminal representing credit and transaction information. Additionally, the device includes two circuit means for receiving signals. The first circuit means is for receiving the financial information signals from the credit card terminal. The second circuit means is for receiving from the telephone station verification signals representing verification information from a host computer.

Finally, the device of the present invention includes a control circuit. The control circuit not only controls the means for converting, but also the first and second circuit means for receiving the respective signals. The control circuit further routes the financial information signals from the credit card terminal to the telephone station and routes the verification signals from the telephone station to the credit card terminal.

A second aspect of the present invention described and disclosed herein comprises an acoustic coupler for providing communication between a credit card terminal interface and a telephone station. The telephone station includes a handset having a transmitting portion and a receiving portion.

The acoustic coupler includes means for receiving audio signals from the transmitting portion of the handset. In the preferred embodiment, the means for receiving is a microphone. The acoustic coupler further includes means for transmitting audio signals to the receiving portion of the handset. In the preferred embodiment, the means for transmitting is a speaker.

The acoustic coupler also includes means for adjusting the acoustic coupler to correspond to the physical characteristics of the handset. In the preferred embodiment the microphone and speaker are slidably mounted on a frame such that they may be adjusted to correspond with the receiving portion of the handset and the transmitting portion of the handset respectively.

The acoustic coupler finally includes means for attaching the acoustic coupler to the telephone handset. In the preferred embodiment, the acoustic coupler includes an attached velcro strip which can be wrapped around both the acoustic coupler and the handset to attach them to each other.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
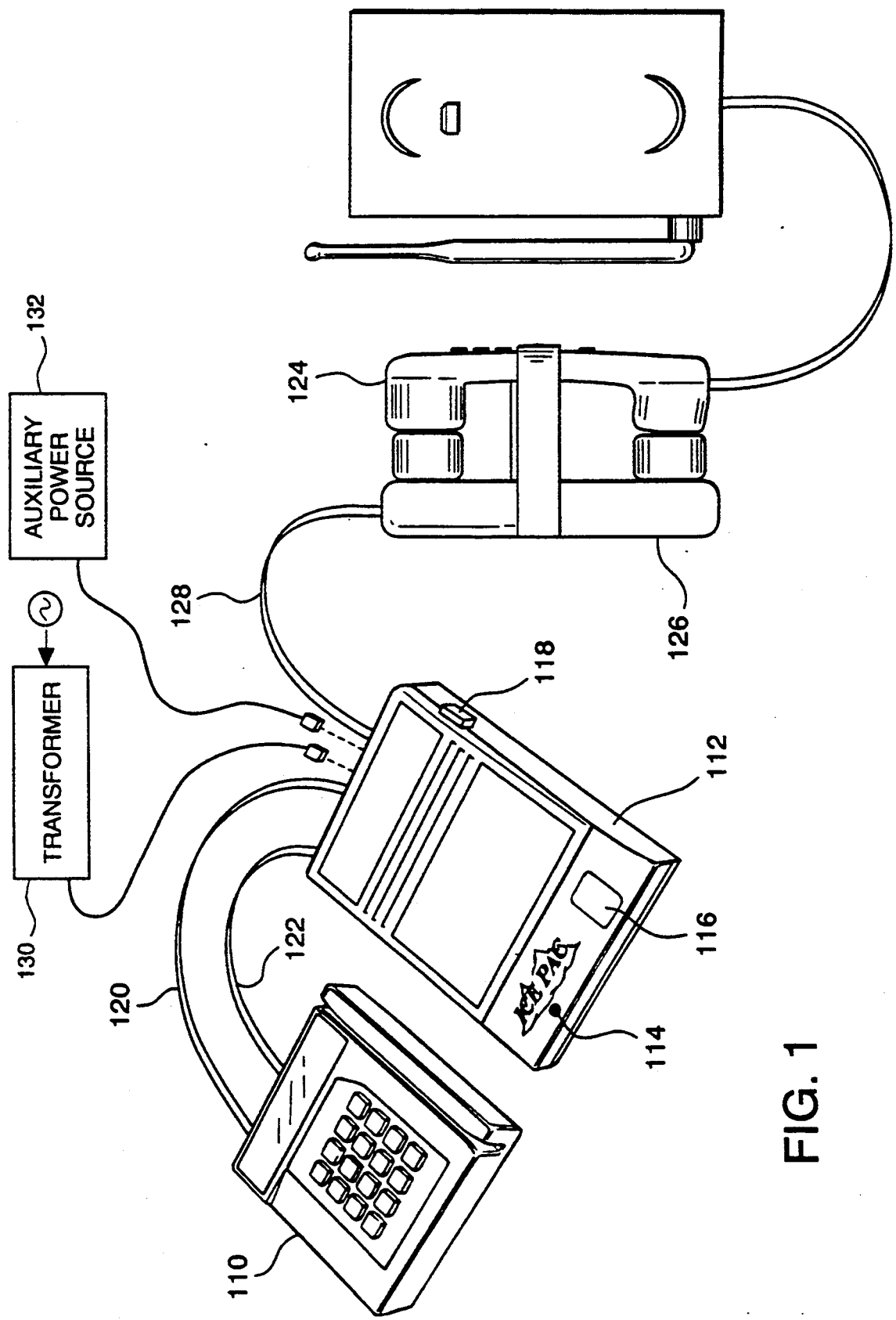
FIG. 1 is a schematic view showing a typical hardware configuration in accordance with the present invention.

Referring now to the drawing figures, there is illustrated in FIG. 1 a credit card terminal 110 connected to a credit card terminal interface 112. Credit card terminal interface 112 includes charging indicator 114, status indicator 116, power switch 118 and power cable 120.

Charging indicator 114 is an LED which, when lit, indicates that the internal batteries are being charged. Status indicator 116 is an indicator capable of producing the colors red, green and yellow. A solid red status indicator 116 indicates that the internal battery is low. A solid green status indicator 116 indicates that credit card terminal interface 112 is processing a transaction. A blinking yellow status indicator 116, indicates that credit card terminal interface 112 has completed processing a transaction.

Power cable 120 provides power to credit card terminal 110 from credit card terminal interface 112. Power cable 120 terminates with a 25 mm ID/55 mm OD barrel plug which is connectable to a corresponding barrel jack mounted in credit card terminal 110.

Credit card terminal 110 is also connected to credit card terminal interface 112 via data cable 122. Data cable 122 is a cable having a standard RJ11 plug on each of its ends. One end of data cable 122 is attached to an RJ11 jack mounted in credit card terminal 110. The other end of data cable 122 is attached to an RJ11 jack mounted in credit card terminal interface 112. Data cable 122 permits communication between credit card terminal 110 and credit card terminal interface 112.

Credit card terminal interface 112 is also connected to cellular telephone station 124. This connection is achieved using acoustic coupler 126 including cable 128. Cable 128 is connected to credit card terminal interface 112 using a standard RJ48 plug at one end of cable 128 which is connected to a corresponding RJ48 plug mounted in credit card terminal interface 112.

Acoustic coupler 126 is secured to cellular telephone station 124 by a strap having a velcro fastener. Using cellular telephone station 124 to contact a host computer, the hardware configuration of FIG. 1 provides communication between credit card terminal 110 and the host computer for credit verification. Although telephone station 124 is based on cellular communication technology, the present invention would function equally well with a wire based telephone station.

Also illustrated in FIG. 1, are transformer 130 and auxiliary power source 132. Transformer 130 is used to charge the internal batteries of the credit card terminal interface 112. Auxiliary power source 132 is used to supplement the power of the internal batteries of the credit card terminal interface 112.

Transformer 130 can be connected to credit card terminal interface 112 by inserting a 5-pin din plug of transformer 130 into an associated 5-pin jack mounted within credit card terminal interface 112. Transformer 130 is also connected to an AC power source.

Auxiliary power source 132 can be connected to credit card terminal interface 112 by inserting a barrel plug of auxiliary power source 132 into an associated barrel jack mounted within credit card terminal interface 112. Auxiliary power source 132 provides DC power to credit card terminal interface 112.

Figure 2:
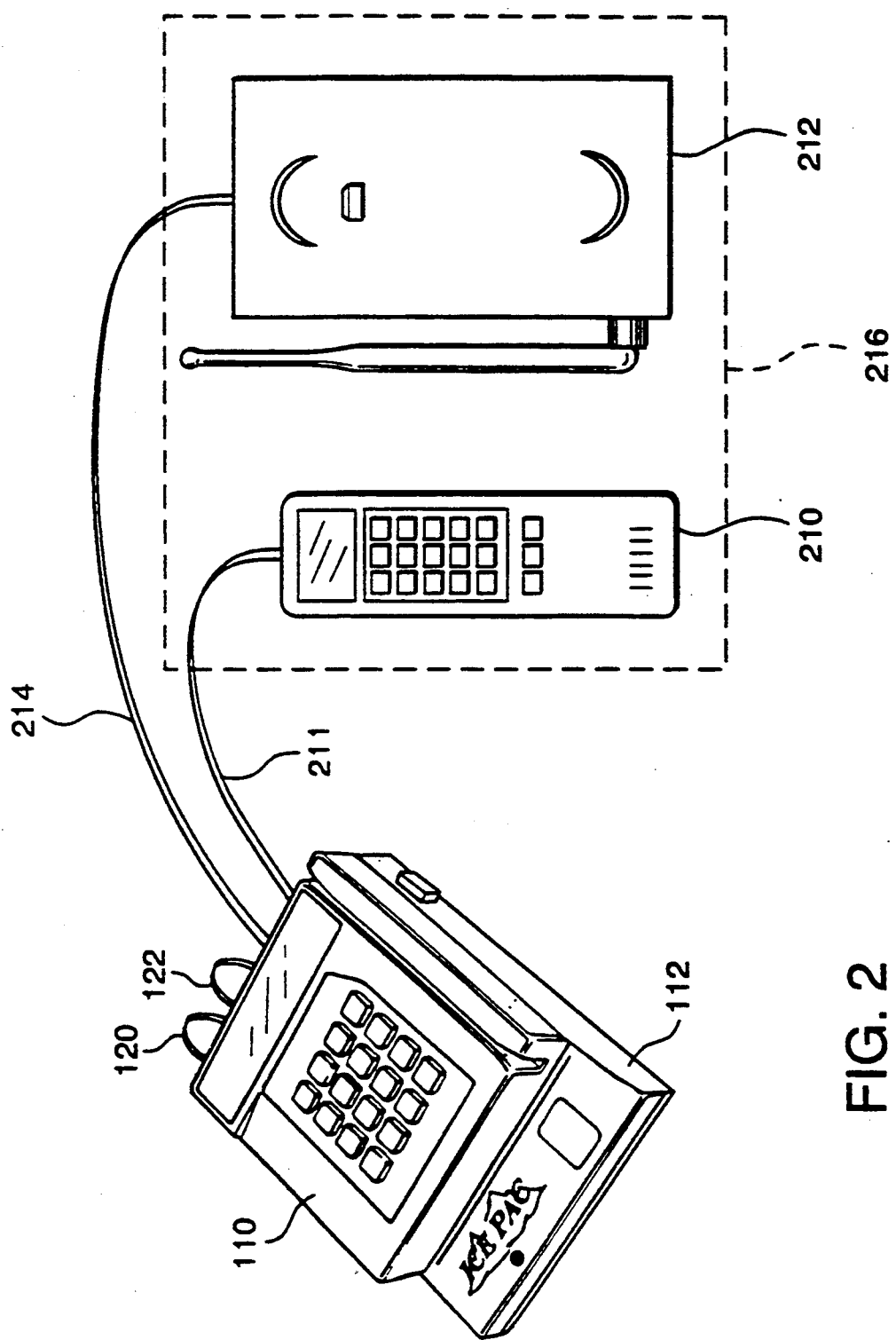
FIG. 2 is a schematic view showing an alternative hardware configuration in accordance with the present invention.

There is illustrated in FIG. 2 an alternative hardware configuration in accordance with the present invention. FIG. 2 illustrates credit card terminal 110 connected to credit card terminal interface 112, as illustrated in FIG. 1, via power cable 120 and data cable 122.

Credit card terminal interface 112 is also connected to cellular telephone station 216. Cellular telephone station 216 includes handset 210 and transceiver base 212. Handset 210 includes cable 211 having a standard RJ48 plug. Transceiver base 212 includes a standard RJ48 jack.

For normal voice communication using cellular telephone station 216, handset 210 would be plugged into transceiver base 212. For data communication in accordance with the present invention, the RJ48 plug of handset 210 is connected to a first RJ48 jack mounted in credit card terminal interface 112.

In addition, cable 214 having an RJ48 plug on each end is used to connect credit card terminal interface 112 and transceiver base 212. One end of cable 214 is connected to a second RJ48 jack mounted in credit card terminal interface 112. The other end of cable 214 is connected to the RJ48 jack mounted in transceiver base 212.

Figure 3:
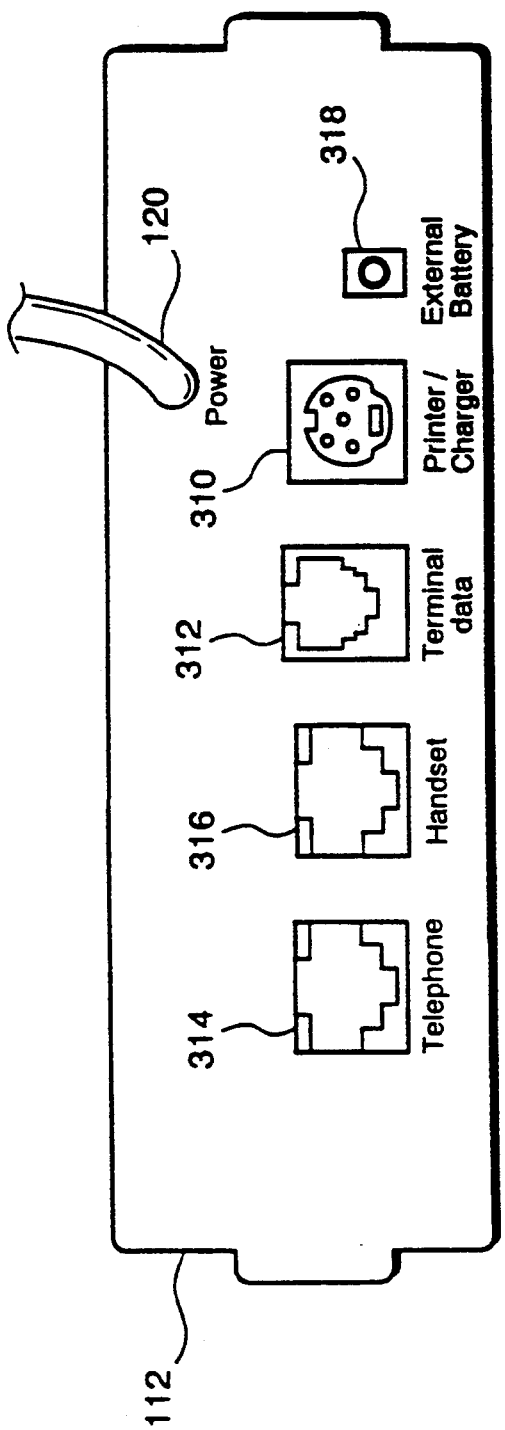
FIG. 3 is a rear view of the credit card terminal interface of the present invention.

Referring now to FIG. 3, there is illustrated the rear panel of credit card terminal interface 112. Credit card terminal interface 112 includes 5-pin din jack 310 for providing connection to a printer and/or transformer 130. Credit card terminal interface 112 further includes an RJ11 jack for data communication between credit card terminal interface 112 and credit card terminal 110.

The rear panel also includes a first RJ48 jack 314 for connection to cellular telephone handset 210 and a second RJ48 jack 316 for connection to cellular telephone transceiver 212. In an embodiment including acoustic coupler 126, either jack 314 or 316 may be used. In embodiments including cellular telephone station 216, RJ48 jacks 314 and 316 may be used interchangeably.

Barrel jack 318 is provided for connection to auxiliary power source 132 such as a battery pack or AC power converter. In the preferred embodiment, the credit card terminal interface 112 includes control logic which determines the presence of auxiliary power source 132 and draws energy from it instead of from the internal batteries.

Finally, FIG. 3 illustrates the permanent power cable 120. As described in connection with Figure 1, power cable 120 provides a 110 volt AC power supply to the credit card terminal 110.

Figure 4:
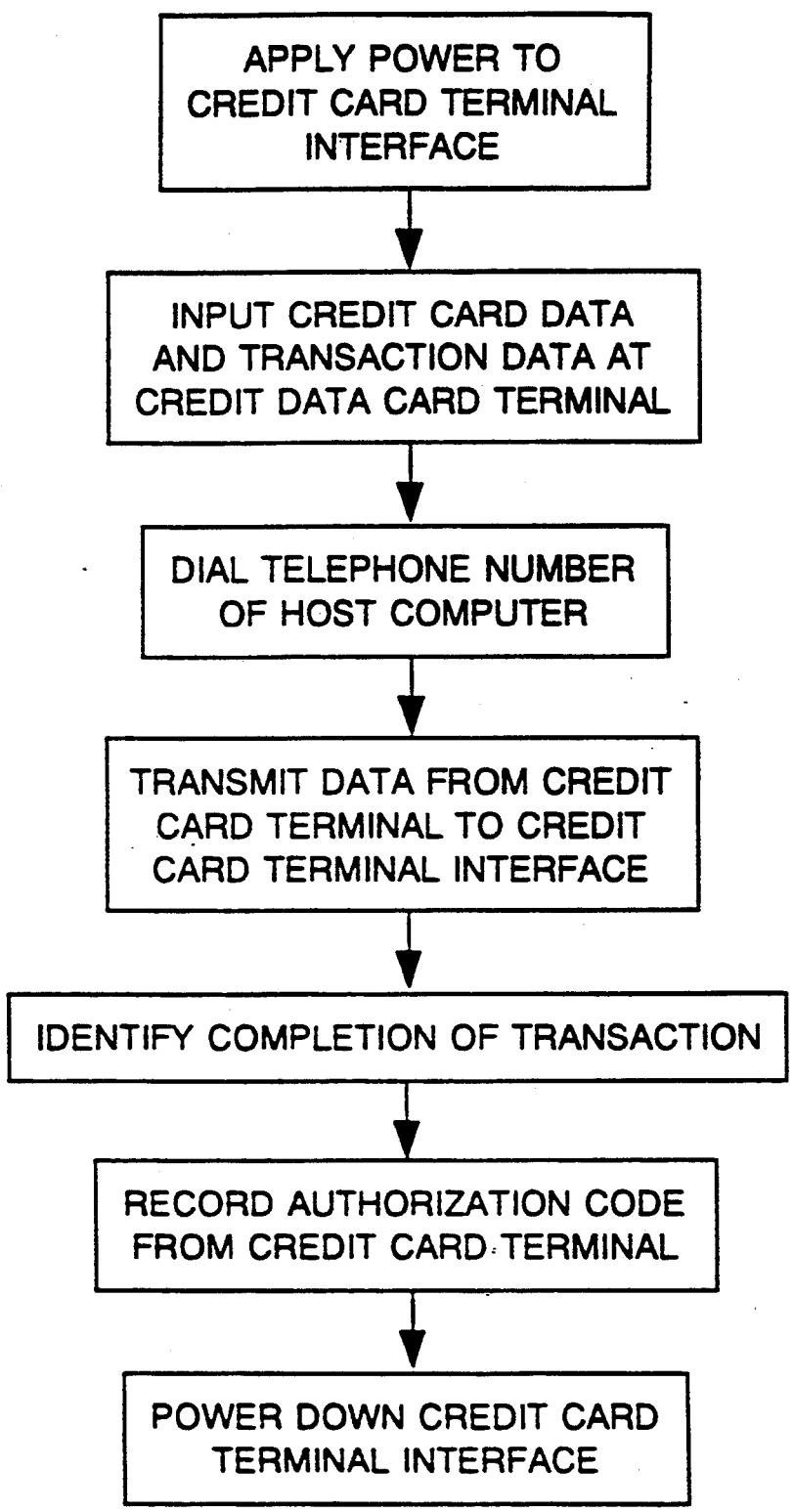
FIG. 4 is a functional block diagram illustrating a method of using the present invention.

Referring now to FIG. 4, there is illustrated, in block diagram format, steps describing a typical use of the preferred embodiment. First, power must be applied to credit card terminal interface 112. This is accomplished by pressing power switch 118. Upon initial application of power, control logic within the credit card terminal interface 112 monitors transaction processing activity. After two minutes of inactivity, the control logic will power down credit card terminal interface 112.

Next, the user must input credit card data and transaction data at credit card terminal 110. This is typically performed by passing the magnetic strip of a credit card through a magnetic reader and manually entering the transaction amount using a keypad of credit card terminal 110.

The third step is to dial the telephone number associated with the host computer. This step may be performed manually through the keypad of the attached telephone 124 or automatically using a preprogrammed telephone number stored in the attached telephone 124.

After dialing the telephone number of the host computer, the user must cause the data input at credit card terminal 110 to be transmitted to credit card terminal interface 112. This is typically accomplished by pressing an "ENTER" button at credit card terminal 110.

The user may monitor the transaction by watching status light 116. A solid green status light 116 indicates that a transaction is being processed. A blinking yellow status light 116 indicates that the transaction processing has terminated.

The blinking yellow status light 116 is a reminder to the user to verify that the cellular call has terminated. Although the cellular call will terminate automatically when the transaction is complete, because cellular air time is costly, the blinking yellow light serves as a backup.

After the transaction is complete, the user should record the authorization code received at the credit card terminal. To conserve energy, the user should manually power down the credit card terminal interface, using power switch 118. If the user does not manually power down credit card terminal interface 112 within one minute of the completion of the transaction processing, credit card terminal interface 112 will activate a warning buzzer indicating that credit card terminal interface 112 will automatically power down in one minute.

Once credit card terminal interface 112 has been powered down, either manually or automatically, any authorization codes must be retrieved manually from credit card terminal 110. Recording the authorization code prior to powering down credit card terminal interface 112 allows the user to avoid this procedure.

Figure 5:
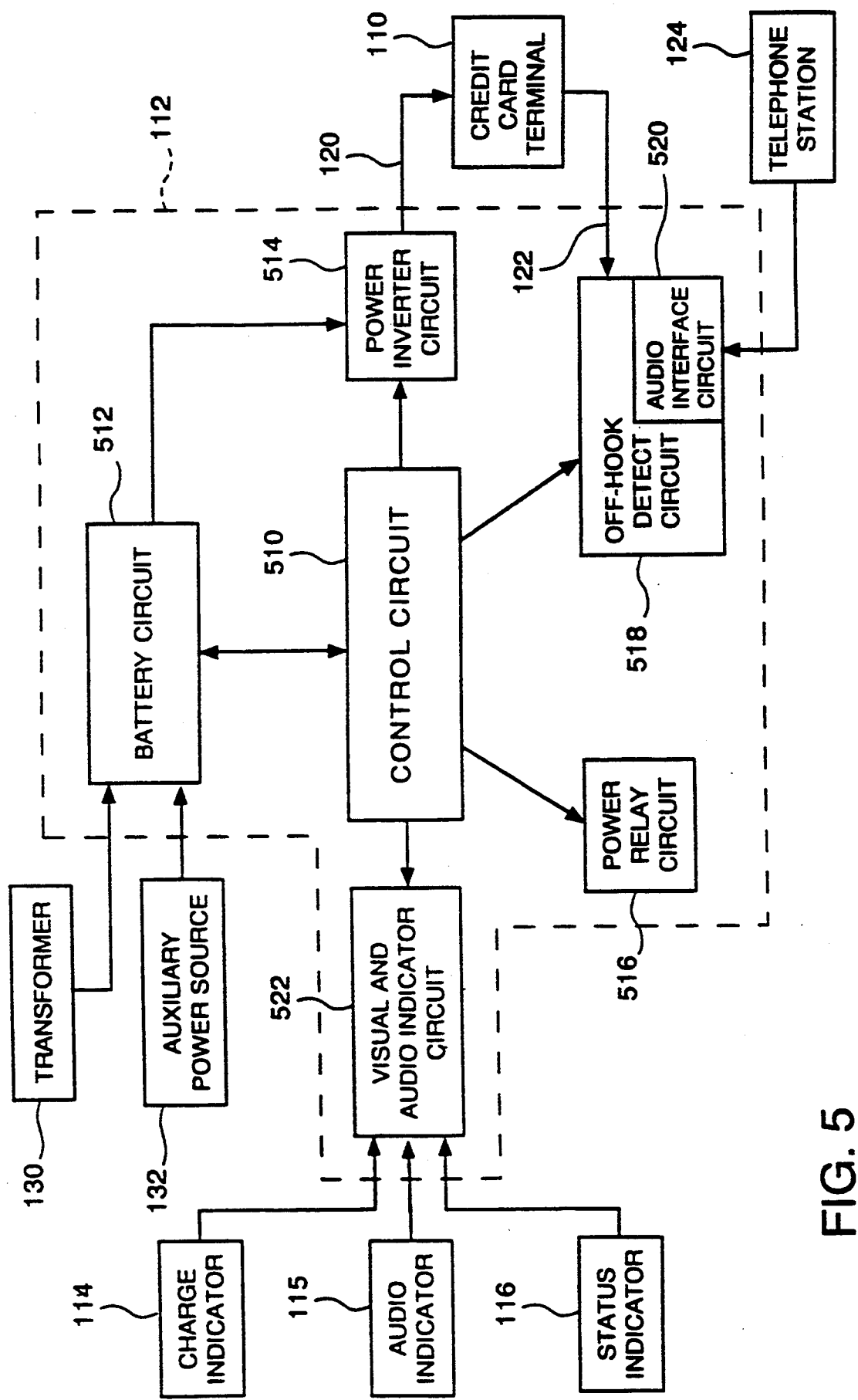
FIG. 5 is a block diagram illustrating the circuitry of the portable credit card terminal interface of the present invention.

Referring now to FIG. 5, there is illustrated the major circuit components of the portable credit card terminal interface of the present invention. The device is centered around a control circuit 510 incorporating a Microchip PIC 15C54 8-bit micro-controller. The micro-controller includes approximately 1000 words of firmware which is responsible for timing, sequencing enabling and disabling the other major circuit components. Although other control means could be employed, the PIC 15C54 was selected due to the small pin count and economical cost.

Battery and charge circuit 512 monitors, charges and directs the current flow from the internal batteries of portable credit card terminal interface 112. Transformer 130 and auxiliary power source 132 are removably connectable to battery and charge circuit 512.

Battery and charge circuit 512 operates in two modes and is based on a Benchmarq fast charge IC design which incorporates an embedded micro-controller described in the Benchmarq BQ2003 Application Notes. The first mode permits the internal batteries to be charged and the second mode provides current to operate the interface.

The Benchmarq fast charge IC provides four charge states for recharging the internal batteries. If the circuit determines that the internal batteries have been deeply discharged, the circuit enters the pre-charge state for three to four minutes. While the device is in the pre-charge state, control circuit 510 directs visual and audio indicator circuit 522 to display a slowly flashing charge indicator 114.

The second of four possible charge states is the rapid charge state which lasts two hours. This charge state is identified by a solid red charge indicator 114. The rapid charge duration is based on a negative delta v technique which is well known in the art.

The third charge state is a top-off charge which completely charges the internal batteries. This charge state is identified by a rapidly flashing charge indicator 114. The top-off charge state lasts for approximately one hour.

The final charge state is a trickle-charge. This state is designed to sustain the internal batteries at maximum capacity and is transparent to the user.

Block 514 represents a power inverter circuit. Power inverter circuit 514 converts DC power into AC power and provides the AC power to credit card terminal 110 through power cable 120. Power inverter circuit 514 is an H-bridge circuit which is well known in the art. The timing and sequencing of power inverter circuit 514 is controlled by control circuit 510 to create a 60 cycle square wave form.

Power relay circuit 516 is controlled by control circuit 510 and provides direct current to an optional transaction printer based on the power status of attached credit card terminal 110. When credit card terminal 110 is turned on, power relay circuit 516 provides direct current to an attached printer through jack 310.

Off-hook detect: circuit 518 is another major component controlled by controller circuit 510. Off-hook detect circuit 518 is responsible for detecting that credit card terminal 110 is ready to communicate with an attached telecommunication line. Off-hook detect circuit 518 includes audio interface circuit 520 which receives signals from both credit card terminal 110 and the telephone station 124.

Audio interface circuit 520 includes a simple audio amplifier and provides isolation and impedance matching between credit card terminal 110 and telephone station 124. In addition, circuit 520 provides signal separation to interface credit card terminal 110 to telephone station 124. Because telephone station 124 maintains separate input and output data paths, the present invention separates the signal of credit card terminal 110 into separate input and output signals.

Audio interface circuit 520 of the preferred embodiment is optimized to operate in two modes. The first mode is intended to work with Motorola cellular telephones which can be directly coupled using two RJ48 connectors 314 and 316. This configuration provides an extremely reliable connection.

The second operating mode of audio interface circuit 520 requires only a single RJ48 connection to an acoustic coupler 126. Acoustic coupler 126 includes a speaker and a microphone which are connected to the same lines used by the Motorola cellular telephones referenced above. To work in this configuration, the audio interface circuit 520 requires an extra component which stabilizes the microphone and balances the gain on the amplifier permitting the audio interface to function correctly in either operating mode.

Visual and audio indicator circuit 522 is the final major circuit component of the portable credit card terminal of the present invention. This circuit includes status indicator 116, charge indicator 114 and audio indicator 115 for alerting the user to different operating modes and conditions. Visual and audio indicator circuit 522 drives these indicators based on signals from control circuit 510.

Figure 6A:
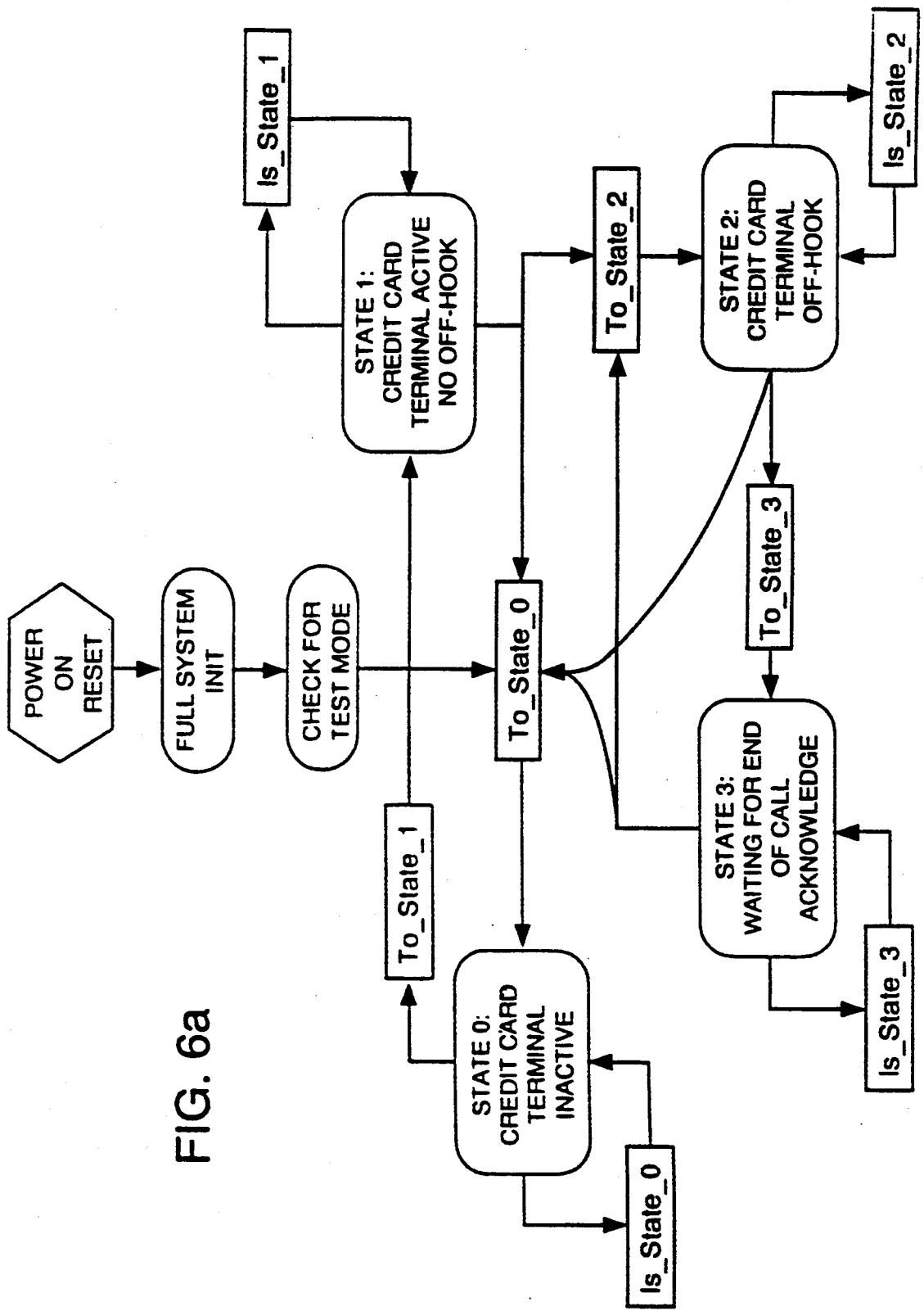
FIG. 6a is a system flow chart illustrating the functional components of the firmware.

Referring now to FIG. 6a, there is illustrated in system flow chart format, the functional components of the firmware. Each functional component represents a routine executed by the processor based on the state of portable credit card terminal interface 112.

Portable credit card terminal interface 112 has four basic states of operation. If attached credit card terminal 110 is inactive, credit card terminal interface 112 processes routines TO_STATE_0 and IS_STATE_0. If credit card terminal 110 is active and there is no phone activity, credit card terminal interface 112 processes routines TO_STATE_1 and IS_STATE_1.

Once credit card terminal interface 112 detects an off-hook condition, routines TO_STATE_2 and IS_STATE_2 are processed. The routines processed during the final state are TO_STATE_3 and IS_STATE_3. The end of the final state is triggered when credit card terminal interface 112 determines that the call has ended, thus completing the transaction. The program flow of each routine is discussed in greater detail with respect to FIGS. 7a–10b.

Figure 6B:
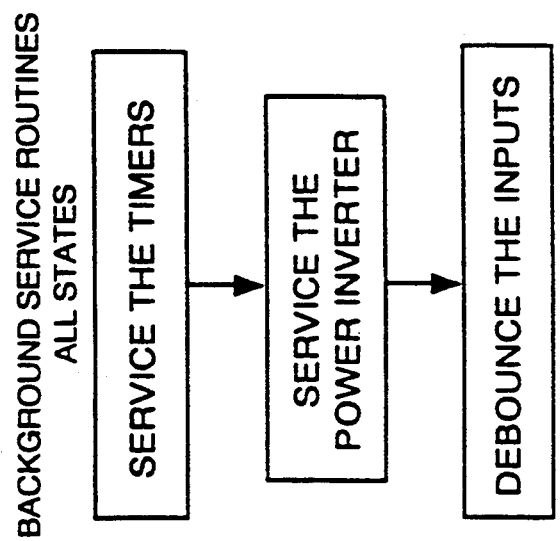
FIG. 6b is a flow chart illustrating the background service tasks of the firmware.

FIG. 6b is a flow chart illustrating the three basic background service tasks of the firmware. The first task is to service the timers; the second task is to service the power inverter; and the third task is to debounce the inputs. These tasks are processed regardless of the current state of credit card terminal interface 112.

Figure 7A:
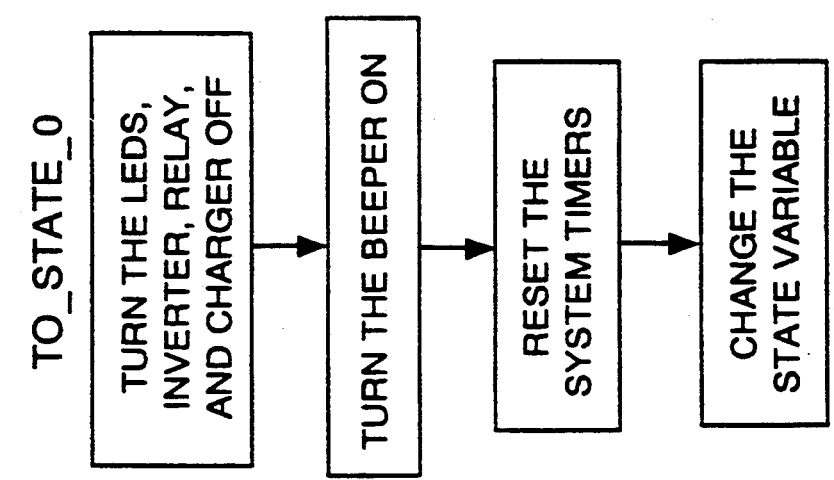
FIG. 7a is a program flow chart illustrating the steps processed during the TO_STATE_0 routine.

Referring now to FIG. 7a, there is illustrated the four basic tasks of the TO_STATE_0 routine. This routine is an initialization routine processed prior to the IS_STATE_0 routine. The TO_STATE_0 routine instructs the processor to turn off the LEDs, power inverter, power relay and battery charger circuit.

This routine further instructs the processor to turn on audio indicator 115, a beeper, to indicate to a user that the credit card terminal interface is powered on. Finally, this routine instructs the processor to reset the system timers and change the state variable to reflect state 0.

Figure 7B:
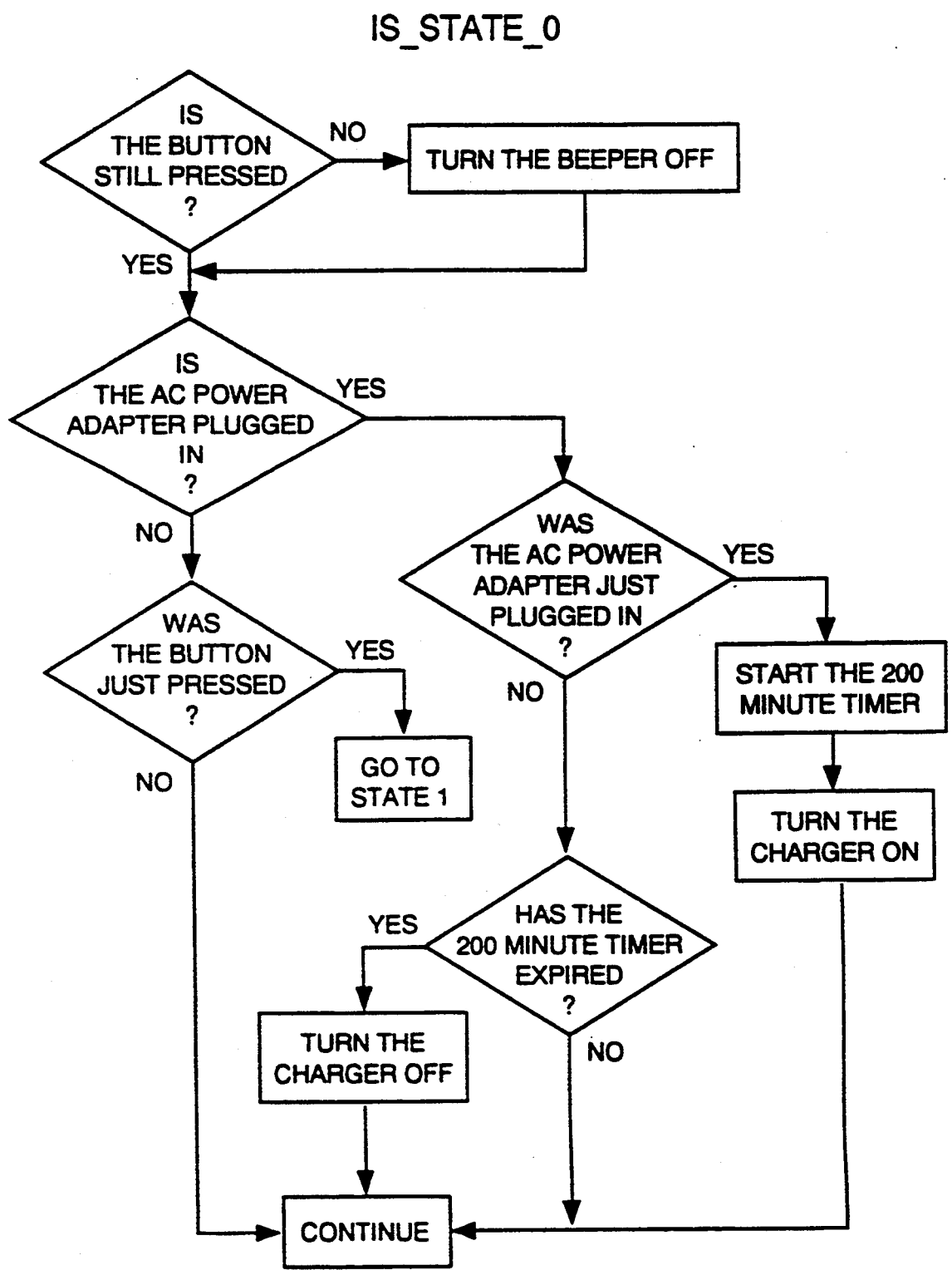
FIG. 7b is a program flow chart illustrating the steps processed during the IS_STATE_0 routine.

FIG. 7b illustrates the program flow of the IS_STATE_0 routine. IS_STATE_0 is a loop which is processed as long as the credit card terminal is inactive. As illustrated, IS_STATE_0 instructs the processor to check the state of power button 118. If power button 118 is not pressed, audio indicator 115 should be turned off.

Next, IS_STATE_0 instructs the processor to determine if transformer 130 is plugged in. When transformer 130 is first plugged in, a 200 minute charge timer is started and battery and charge circuit 512 is enabled.

If transformer 130 has been plugged in for some time, the charge timer is examined. If the charge timer has expired, the battery and charge circuit 512 is disabled.

If transformer 130 is not plugged in, the state of power button 118 is examined. If power button 118 has been recently pressed, the processor is directed to process TO_STATE_1. If power button 118 has not been recently pressed, the processor begins processing IS_STATE_0 at the beginning.

Figure 8A:
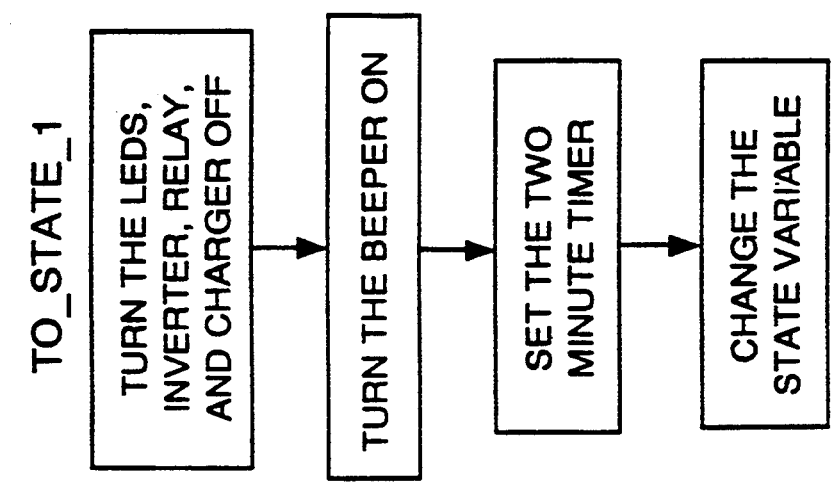
FIG. 8a is a program flow chart illustrating the steps processed during the TO_STATE_1 routine.

Referring now to FIG. 8a, there is illustrated the four basic tasks of the TO_STATE_1 routine. This routine is an initialization routine processed prior to IS_STATE_1. TO_STATE_1 instructs the processor to turn off the indicators 114 and 116, power inverter circuit 514, power relay circuit 516 and battery and charge circuit 512.

This routine further instructs the processor to turn audio indicator 115 on to indicate to a user that credit card terminal interface 112 is awaiting an active credit card terminal 110. Next, this routine instructs the processor to set a timer which will reset the system after two minutes. Finally, this routine instructs the processor to change the state variable to reflect state 1.

Figure 8B:
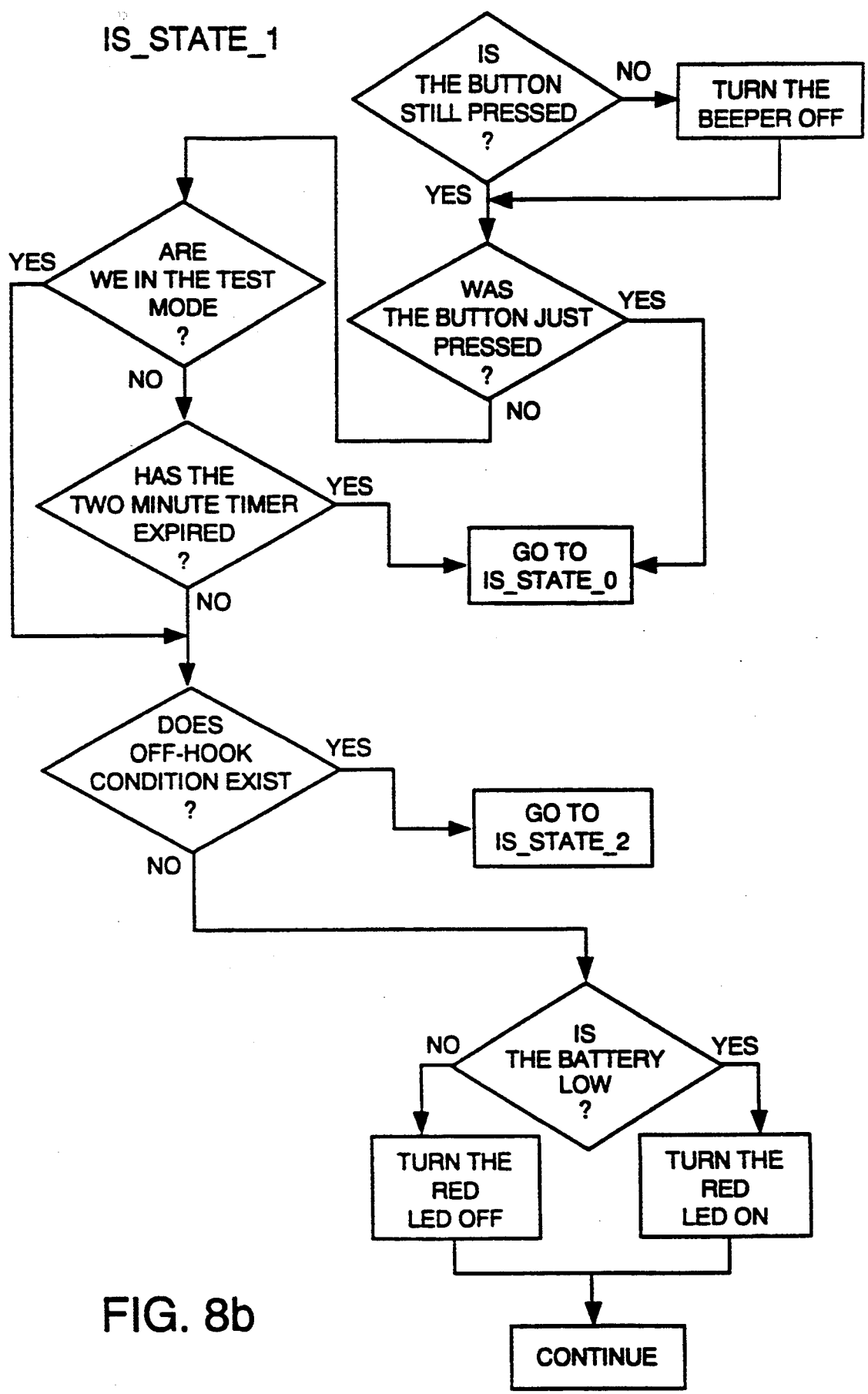
FIG. 8b is a program flow chart illustrating the steps processed during the IS_STATE_1 routine.

FIG. 8b illustrates the program flow of the IS_STATE_1 routine. IS_STATE_1 is essentially a loop which is processed until the two minute timer expires or until the credit card terminal off-hook condition is detected. As illustrated, IS_STATE_1 first instructs the processor to check the state of power button 118. If power button 118 is not pressed, audio indicator 115 is turned off.

Next, IS_STATE_1 instructs the processor to determine if power button 118 was just pressed. If power button 118 was just pressed, the processor is directed to execute IS_STEP_0. If power button 118 was not just pressed, the processor is instructed to determine if credit card terminal interface 112 is in test mode. If the device is not in test mode, the processor is directed to determine if the two minute timer has expired. If the two minute timer has expired, the processor is directed to execute IS_STEP_0.

IS_STEP_1 continues by instructing the processor to determine if the off-hook condition exists. If the off-hook condition exists, the processor is directed to execute the TO_STEP_2 routine. The final portion of the IN_STEP_1 loop includes logic for checking for a low battery condition.

If the internal batteries are low, the red status indicator 116 is energized as an indication to the user of the low battery condition. If the internal batteries are not low, the red status indicator 116 is not energized. Finally, the processor begins processing IS_STATE_1 again at the beginning.

Figure 9B:
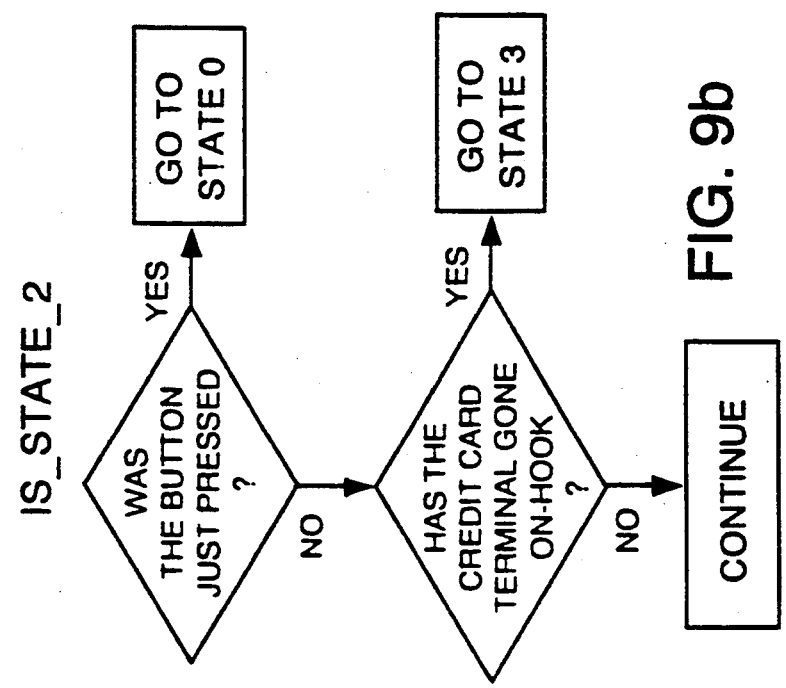
FIG. 9b is a program flow chart illustrating the steps processed during the IS_STATE_2 routine.
Figure 9A:
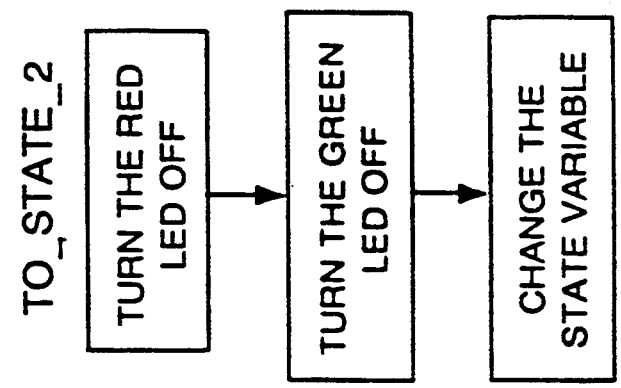
FIG. 9a is a program flow chart illustrating the steps processed during the TO_STATE_2 routine.

Referring now to FIG. 9a, there is illustrated the three basic tasks of the TO_STATE_2 routine. This routine is an initialization routine processed prior to IS_STATE_2. The TO_STATE_2 routine includes logic for turning off both the red and green LEDs 116 and changing the state variable to reflect state 2.

FIG. 9b illustrates the program flow of the IS_STATE_2 routine. IS_STATE_1 is essentially a loop which is processed until either the device is reset by the user or an on-hook condition is detected. If the device is reset by the user, the processor is directed to the TO_STATE_0 routine. If the on-hook condition is detected, the processor is directed to the TO_STATE_3 routine.

Figure 10A:
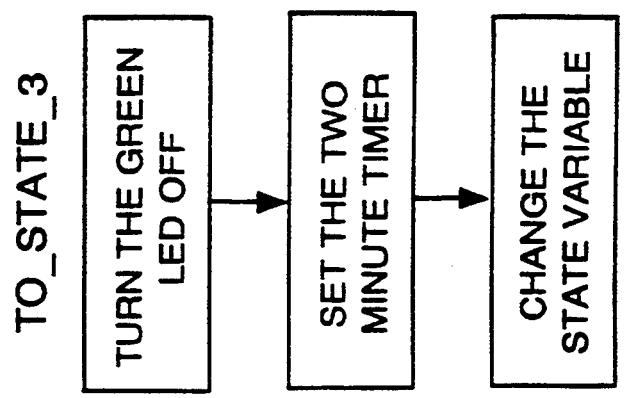
FIG. 10a is a program flow chart illustrating the steps processed during the TO_STATE_3 routine.

Referring now to FIG. 10a, there is illustrated the three basic tasks of the TO_STATE_3 routine. This routine is an initialization routine processed prior to IS_STATE_2. The TO_STATE_3 routine includes logic for turning off the green LED 116, setting the two minute timer and changing the state variable to reflect state 3.

Figure 10B:
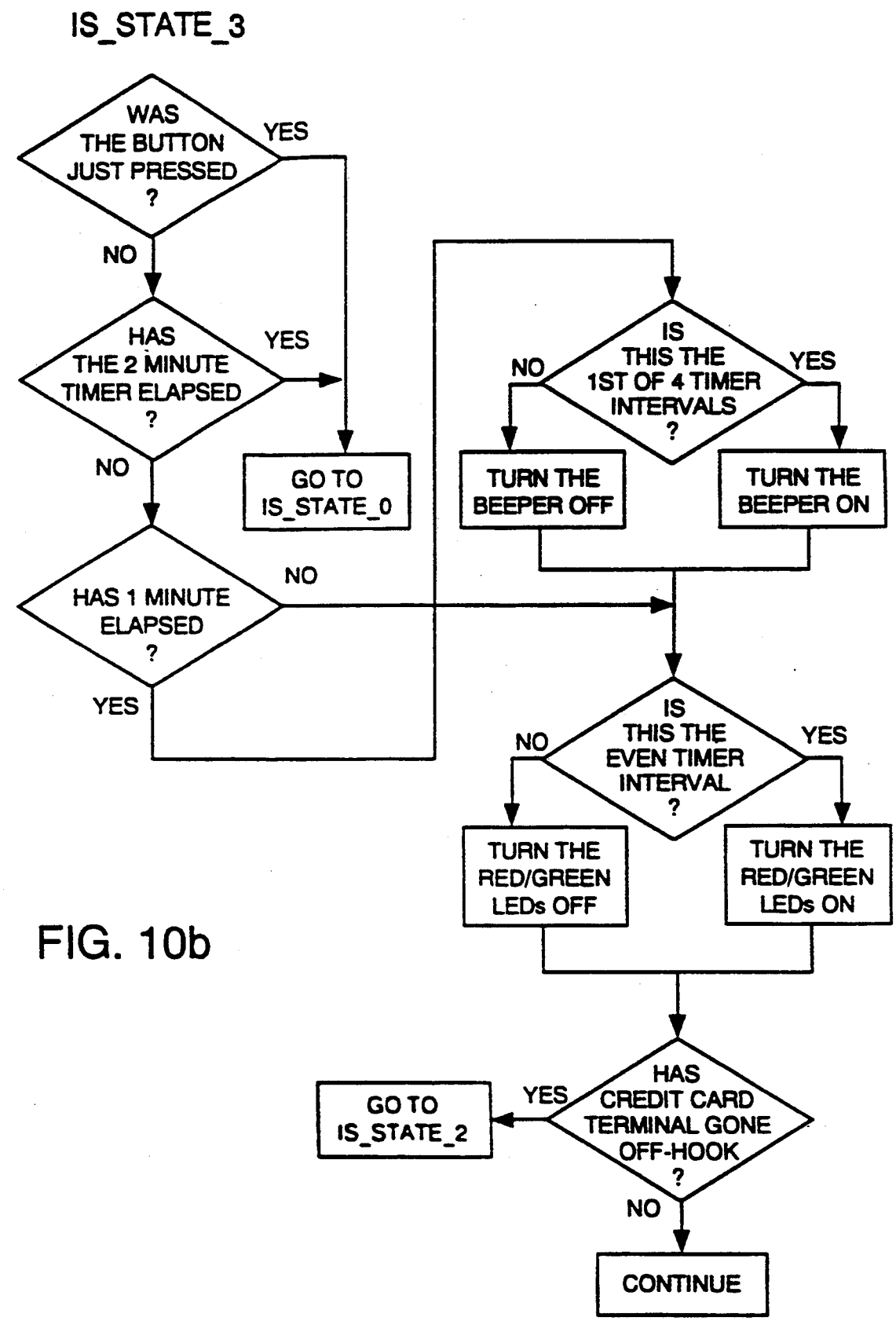
FIG. 10b is a program flow chart illustrating the steps processed during the IS_STATE_3 routine.

Referring finally to FIG. 10b, there is illustrated the program flow of the IS_STATE_3 routine. The IS_STATE_3 routine is essentially a loop which is processed until one of three conditions exist: the device is reset by the user, the two minute timer expires or the telephone off-hook condition is detected.

As illustrated, the IS_STATE_3 routine first includes logic for checking if either the device was reset by the user or the two minute timer has expired. If either of these conditions is true, the processor is directed to the TO_STATE_0 routine.

The IS_STATE_3 routine next instructs the processor to determine whether one minute has elapsed. If one minute has elapsed, audio indicator 115 is turned on or off depending on whether this is the first of four timer intervals.

The routine continues by instructing the processor to determine if the current timer interval is even or odd and turns the red and green LEDs of indicator 116 on or off accordingly. Finally, the routine instructs the processor to test whether the credit card terminal off-hook condition exists. If the off-hook condition exists, the processor proceeds to the TO_STATE_2 routine otherwise the processor begins processing IS_STATE_3 again at the beginning.

Although the best mode for carrying out the invention has been described in detail, those familiar with the art to which this invention relates will recognize various alternative designs and embodiments for practicing the invention as defined by the following claims.

What is claimed is:

1. A portable credit card terminal interface for verifying credit information, the portable credit card terminal interface removably connected to a credit card terminal and to a telephone station, the credit card terminal interface comprising:

a D/C power storage device;
   means for converting D/C power from the storage device into A/C power;
   means for transmitting A/C power from the means for converting to the credit card terminal;
   means for detecting financial information signals representing credit and transaction information;
   first circuit means for receiving from the credit card terminal said financial information signals;
   second circuit means for receiving from the telephone station verification signals representing verification information from a host computer; and
   control circuit for controlling the means for converting, the control circuit also controlling the first circuit means to route the financial information signals from the credit card terminal to the telephone station, the control circuit also controlling the second circuit means to route the verification signals from the telephone station to the credit card terminal,
   wherein, the credit card terminal interface is connected to an auxiliary power storage device; and
   wherein, the means for converting includes:
      means for determining that the portable credit card terminal interface is connected to the auxiliary power storage device; and
      means for receiving power from the auxiliary power storage device.

2. The portable credit card terminal interface of claim 1 wherein the telephone station is a cellular telephone station.

3. The portable credit card terminal interface of claim 1 wherein the telephone station includes a handset, the credit card terminal interface being removably connectable to the handset by an acoustic coupler.

4. The portable credit card terminal interface of claim 1 wherein telephone station includes a detachable handset and a base unit, the credit card terminal interface being removably connected to both the detachable handset and the base unit.

5. The portable credit card terminal interface of claim 1 further including means for providing an audible signal indicating a completed transaction.

6. The portable credit card terminal interface of claim 1 further including means for providing a visual signal indicating a completed transaction.

7. The portable credit card terminal interface of claim 1 further being removably connected to the auxiliary power storage device.

8. A credit verification interface kit including:
   a portable credit card terminal interface for verifying credit information, the portable credit card terminal interface removably connected to a credit card terminal and to a telephone station, the credit card terminal interface comprising:
   a D/C power storage device;
   means for converting D/C power from the storage device into A/C power;
   means for transmitting A/C power from the means for converting to the credit card terminal;
   means for detecting financial information signals representing credit and transaction information;
   first circuit means for receiving from the credit card terminal said financial information signals;
   second circuit means for receiving from the telephone station verification signals representing verification information from a host computer; and
   control circuit for controlling the means for converting, the control circuit also controlling the first circuit means to route the financial information signals from the credit card terminal to the telephone station, the control circuit also controlling the second circuit means to route the verification signals from the telephone station to the credit card terminal;
   wherein, the credit card terminal interface is connected to an auxiliary power storage device;
   a transformer connected to an A/C power source to convert A/C power to D/C power for charging the D/C power storage device of the portable credit card terminal interface;
   wherein, the credit card terminal interface further includes:
   means for connecting the credit card terminal to the portable credit card terminal interface; and
   means for connecting the telephone station to the portable credit card terminal interface.

9. The credit verification kit of claim 8 wherein the means for connecting the telephone station to the portable credit card terminal interface is a data cable.

10. The credit verification kit of claim 8 wherein the means for connecting the telephone station to the portable credit card terminal interface is an acoustic coupler.

* * * * *

UNITED STATES PATENT AND TRADEMARK OFFICE
CERTIFICATE OF CORRECTION

PATENT NO. : 5,408,513
DATED : April 18, 1995
INVENTOR(S) : Charles Busch, Jr. et al.

Page 1 of 2

It is certified that error appears in the above-identified patent and that said Letters Patent is hereby corrected as shown below:

Column 10, Lines 43-44, delete "connected" and insert --removably connectable--.

Column 10, Line 44, delete "storage device" and insert --source--.

Column 10, Line 48, delete "storage device" and insert --source--.

Column 10, Line 50, delete "storage device" and insert --source--.

Column 11, Line 3, delete "storage device" and insert --source--.

Column 12, Lines 6-7, delete "connected" and insert --removably connectable--.

UNITED STATES PATENT AND TRADEMARK OFFICE
CERTIFICATE OF CORRECTION

PATENT NO. : 5,408,513
DATED : April 18, 1995
INVENTOR(S) : Charles Busch, Jr., et al.

It is certified that error appears in the above-indentified patent and that said Letters Patent is hereby corrected as shown below:

Column 12, Line 7, delete "storage device" and insert --source--.

Signed and Sealed this

Twenty-first Day of May, 1996

Attest:

BRUCE LEHMAN

*Attesting Officer*      *Commissioner of Patents and Trademarks*